United States Patent [19]

Wiedamann

[11] 3,960,646

[45] June 1, 1976

[54] TAPE TAB CUTTER AND APPLICATOR

[75] Inventor: Karl Edward Wiedamann, Cincinnati, Ohio

[73] Assignee: The Procter & Gamble Company, Cincinnati, Ohio

[22] Filed: Sept. 18, 1972

[21] Appl. No.: 289,898

[52] U.S. Cl. .................................. 156/518; 156/520

[51] Int. Cl.[2] ........................ B32B 31/00; B31F 1/00

[58] Field of Search ........... 156/265, 285, 518, 521, 156/519, 523

[56] References Cited

UNITED STATES PATENTS

| | | | |
|---|---|---|---|
| 2,642,116 | 6/1953 | Fisher et al. | 156/521 X |
| 3,322,600 | 5/1967 | Harrison et al. | 156/461 |
| 3,356,558 | 12/1967 | Smith | 152/519 |
| 3,472,724 | 10/1969 | Casey | 156/521 |

*Primary Examiner*—William A. Powell
*Assistant Examiner*—David A. Simmons
*Attorney, Agent, or Firm*—Elliot A. Lackenbach; John V. Gorman; Richard C. Witte

[57] ABSTRACT

A tape tab cutting and applying mechanism in which a rotating orbiting tape head picks up a tape tab at one station and transports it to an applying station for applying tape tabs at spaced intervals on a moving web or line of successive objects. The tape tab is essentially perpendicular to the path of the tape head at the pick-up station and parallel to the web or article at the applying station.

11 Claims, 6 Drawing Figures

TAPE TAB CUTTER AND APPLICATOR

FIELD OF THE INVENTION

This invention relates to the dispensing and severing of lengths of tape from a supply thereof to form tape tabs and to transporting and applying the tape to the surface of an object or article.

DESCRIPTION OF THE PRIOR ART

Many of the prior art tape applicators teach a rotating vacuum transfer wheel which is in tangential contact with the article to be taped. The free end of a bulk supply of tape is in contact with the periphery of the transfer wheel through an arc thereof and a reciprocating knife is operatively associated with the transfer wheel to provide a cutoff mechanism wherein the knife intermittently comes in contact with the wheel such that the wheel acts as an anvil. The vacuum within the wheel holds the severed length of tape in contact with the wheel's periphery so that the severed length of tape is transferred to the article. See U.S. Pat. Nos. 2,990,081, issued to De Neui et al. on June 27, 1961; 2,958,365, issued to Molins et al. on Nov. 1, 1960; 3,322,600, issued to Harrison et al. on May 30, 1967; 3,395,064, issued to Schmermund on July 30, 1968; and 3,586,586, issued to Berg on June 22, 1971. Tape applicators like those just mentioned have some shortcomings in that they do not necessarily accurately locate the tape tab on the article due to possible slippage of the tape tab on the wheel, the bulk tape having relative motion with respect to the wheel — depositing some of its material on the wheel and thereby "gumming" up the wheel, and the continuous accurate and reliable cutting of the tape being jeopardized by the accumulation of tape particles about the knife and anvil from the cutting process.

Other mechanisms for cutting and applying lengths of tape to continuously moving objects are taught by the prior art, for example, U.S. Pat. No. 3,356,558, issued to Smith on Dec. 5, 1967 which teached a rotatable, oscillatable, multisided, applicator block having vacuum means therein to hold the end of a continuous supply of tape to the block and a reciprocating knife which intermittently contacts the block to form a cutoff mechanism wherein the block acts as an anvil; the block is intermittently oscillated and rotated to bring its next tape bearing surface into contact with the article to be taped.

U.S. Pat. Nos. 3,540,969, issued to Jorgensen on Nov. 17, 1970, and 3,577,297, issued to Howard on May 4, 1971, which teach taping apparatuses fed from a bulk tape source to a tangential contact point between an applying roller and the article to be taped and a reciprocating knife operating on the tape after a sufficient length of tape has been applied to the article.

U.S. Pat. No. 2,642,116, issued to Fisher et al. on June 16, 1953, which teaches a pad cutting and applying device wherein the pad is advanced perpendicular to the movement of the article to which the pad is applied, and the knife and carrier surface of the pad handling member is fixed to an orbiting rod such that the severed pad lengths are carried and applied parallel to the surface of the article.

U.S. Pat. No. 3,012,481, issued to Hughes on Dec. 12, 1961 which teaches a tape severing and applying device wherein the tape is intermittently advanced across an anvil and is cut by rotating cutter and carrier which pushes the severed tape lengths across an arcuately shaped surface, which surface corresponds to the arc passed through by the cutter and carrier, to the article to be taped.

U.S. Pat. No. 3,298,891, issued to Beck on Jan. 17, 1967, which teaches a tape cutting and applying device wherein a knife and severed tape length holding means are incorporated into a rotating member, and a stationary anvil is positioned to cooperate with the knife as the knife passes the anvil. The severed tape length holder being on the rotating member is in tangential contangential contact with the article to be taped.

Prior art also shows adhesive tape propelling mechanisms, such as in U.S. Pat. No. 2,684,240, issued to Lindsey on July 20, 1954, wherein a free standing projected length is stiffened to provide ease of cutting; and tape severing apparatuses wherein a knife reciprocates past an anvil and the anvil is moved by the knife such as is shown in U.S. Pat. No. 3,472,724, issued to Casey on Oct. 14, 1969.

However, none of the prior art known to the applicant provides a tape pick-up and/or applying mechanism which continuously at high speeds will accurately and reliably place tape tabs on a moving web or continuous stream of articles.

OBJECTS OF THE INVENTION

It is an object of this invention to provide a mechanism which will accurately space successive tape tabs on a continuously moving web.

It is another object of this invention to provide a mechanism which will accurately locate each of successive tape tabs on a constantly moving web.

It is an additional object of this invention to provide a mechanism wherein tape tabs are continuously accurately and reliably cut and subsequently transferred and applied to a continuously moving web with accuracy and reliability.

An additional object of this invention is to provide a mechanism wherein there is no relative motion between the tape transfer member, i.e., the tape handling member and the tape.

Another object of this invention is to provide a mechanism wherein a tape tab is parallel to and traveling at the same speed as the continuously moving web when the tape tab approaches and makes contact with the web.

Another object of this invention is to provide a high speed tape tab transfer and applying apparatus wherein the tape tab handling member is rotatable and orbitable.

SUMMARY OF THE INVENTION

In accordance with the present invention, there is provided an apparatus for applying tape tabs at spaced intervals on the surface of a continuously moving web as the web passes through a tape tab applying station; the apparatus comprises an orbitable, rotatable, tape handling member having a tape tab carrying surface; grip means associated with the carrying surface for holding the tape tab in contact with the carrying surface; orbit means operatively associated with the member for moving the member through an orbital path, which path approximates the plane of the web at the applying station; and orienting means operatively associated with the member for orienting the carrying surface parallel to the surface of the web as the member moves through the applying station, whereby the tape tab and the surface of the web in the applying station are substantially parallel when they approximate and contact.

BRIEF DESCRIPTION OF THE DRAWINGS

While the specification concludes with claims particularly pointing out and distinctly claiming the subject matter which is regarded as forming the present invention, it is believed that the present invention will be better understood from the following description taken in connection with the accompanying drawings, in which:

DETAILED DESCRIPTION OF THE INVENTION

Figure 1:
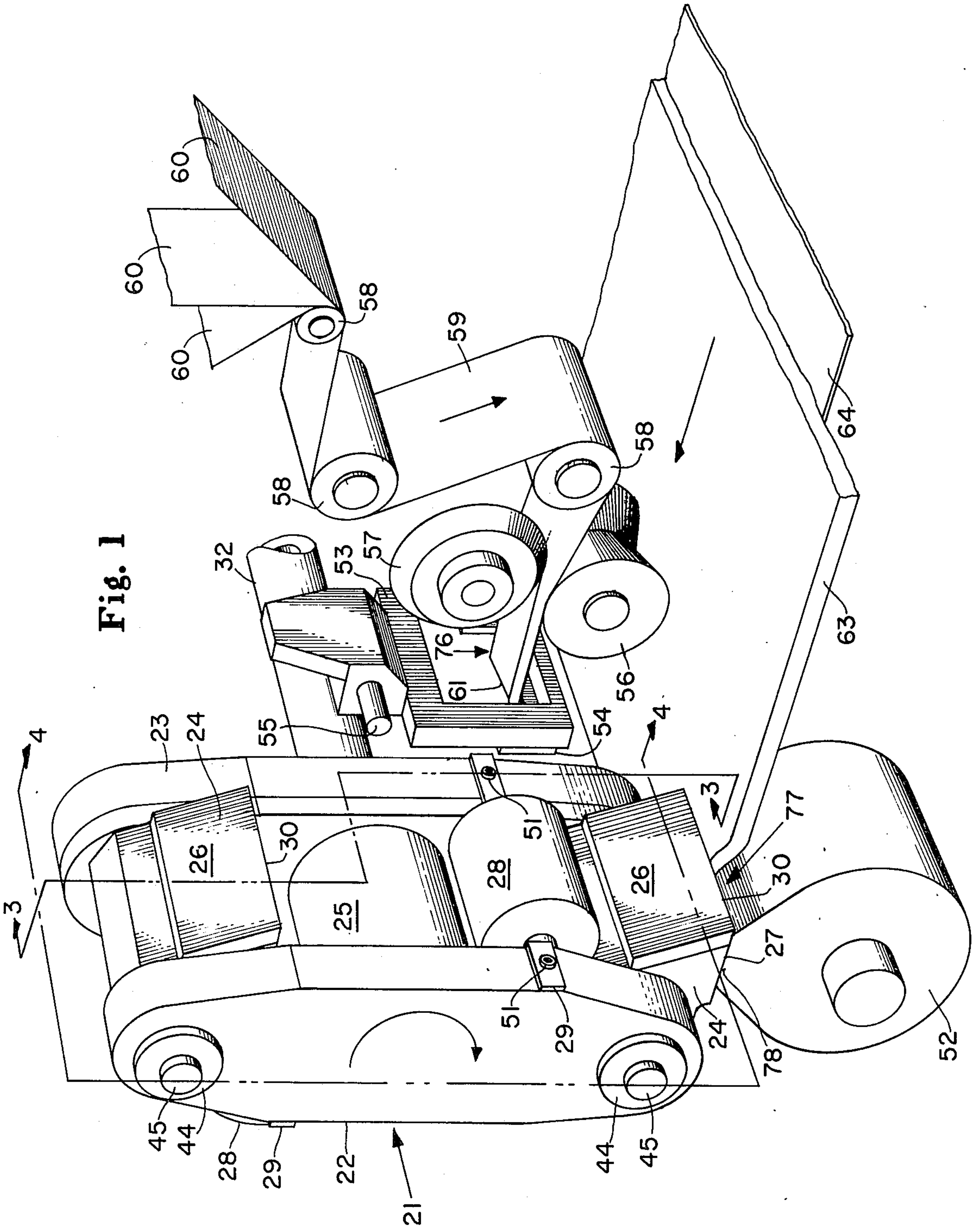
FIG. 1 is a side perspective of a tape tab cutting and applying mechanism of this invention with one head at the applying station.

Turning first to FIG. 1, there is shown a tape tab cutting, transfer, and applicator apparatus or mechanism of this invention. This mechanism removes and cuts discrete lengths of normally tacky pressure sensitive tape from commercial supply roles thereof and applies these lengths of tape, i.e., tape tabs, at spaced intervals on a continuously moving web 63 as the web 63 passes through an applying station 77. This mechanism can also be used to apply tape tabs to a continuous stream of successive articles which would be essentially the same as a continuous web and is intended to fall within the meaning of the term "continuous web" as used herein.

The tape cutting and applying mechanism consists of primarily the tape tab transfer mechanism 21 which rotates clockwise in this embodiment, i.e., in the direction shown by the arrow in FIG. 1, a tape tab pickup station 76 which is positioned adjacent to the path of the tape tab transfer mechanism 21, and a tape tab applying station 77 which is also located adjacent the path of the tape tab transfer mechanism 21.

The tape tab transfer mechanism 21 is rotated by the input shaft 32; has radially outwardly extending arms 22 and 23; has tape tab handling members 24 located radially outward from the input shaft 32 and mounted between the arms 22 and 23; has planetary gear system as an orienting means for the tape tab handling member 24 within the right arm 23 to control the orientation of the tape tab handling members 24 throughout their orbital path; has lubricating rolls 28 mounted between the left arm 22 and the right arm 23; and has a continuous vacuum passage through the input shaft 32, the left arm 22 and into the tape tab handling member 24.

Figure 2:
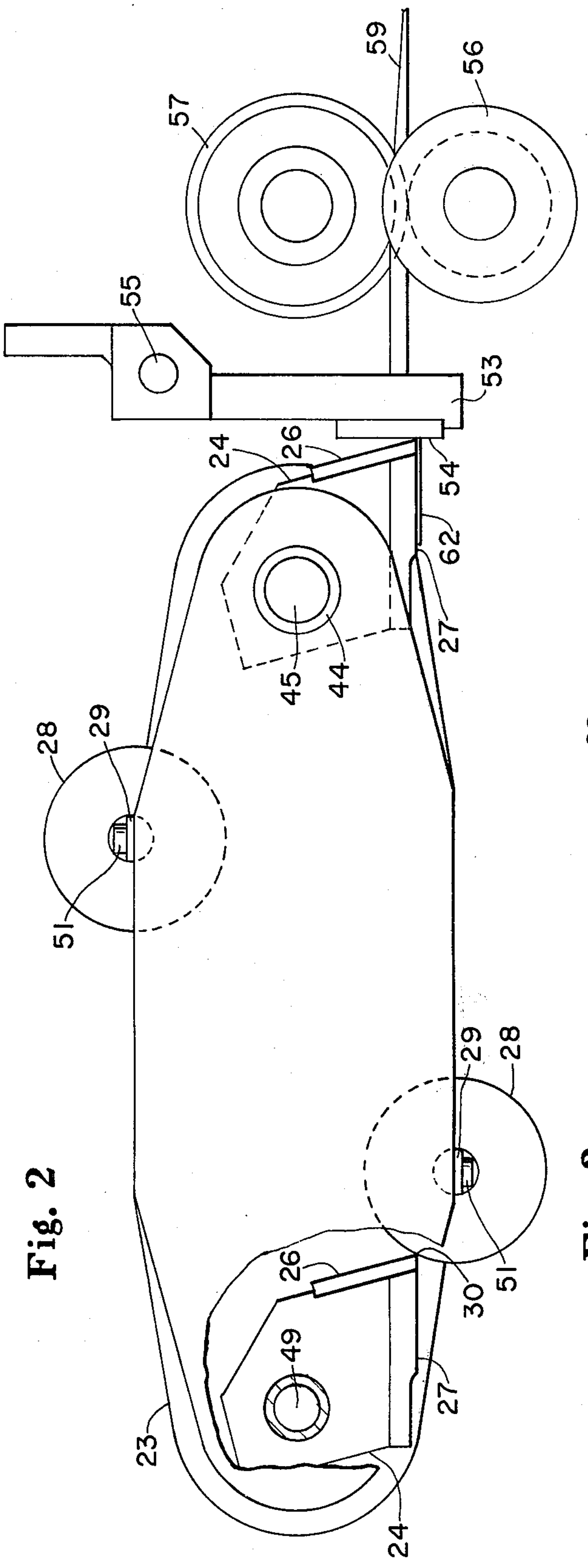
FIG. 2 is a side elevational view, partially fragmented, of a portion of the mechanism shown in FIG. 1 with one of the heads at the cutoff station.
Figure 3:
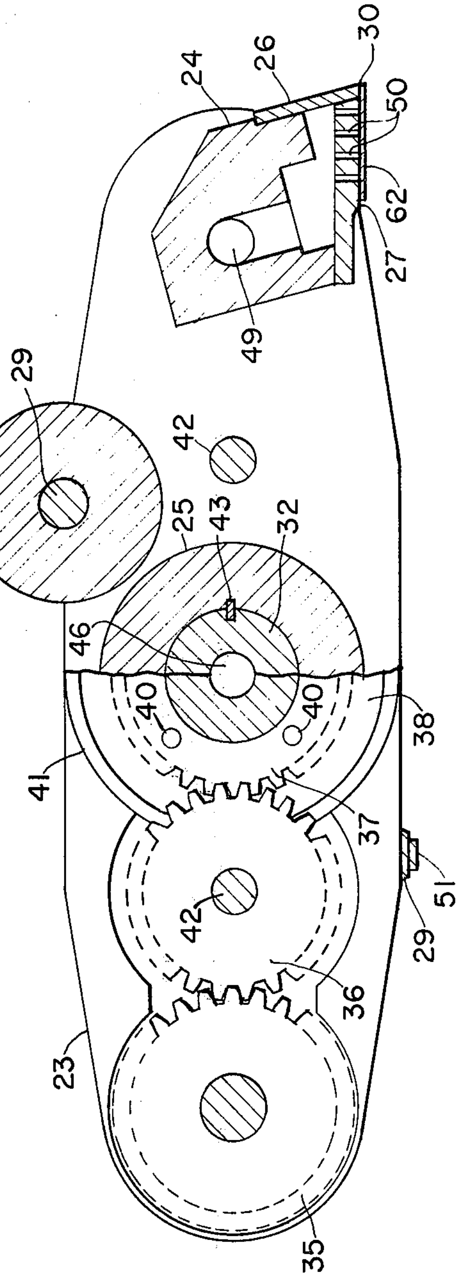
FIG. 3 is a side cross sectional view of the tape tab transfer mechanism taken along line 3—3 of FIG. 1 when the transfer mechanism is in a position wherein one head is at the cutoff station.
Figure 4:
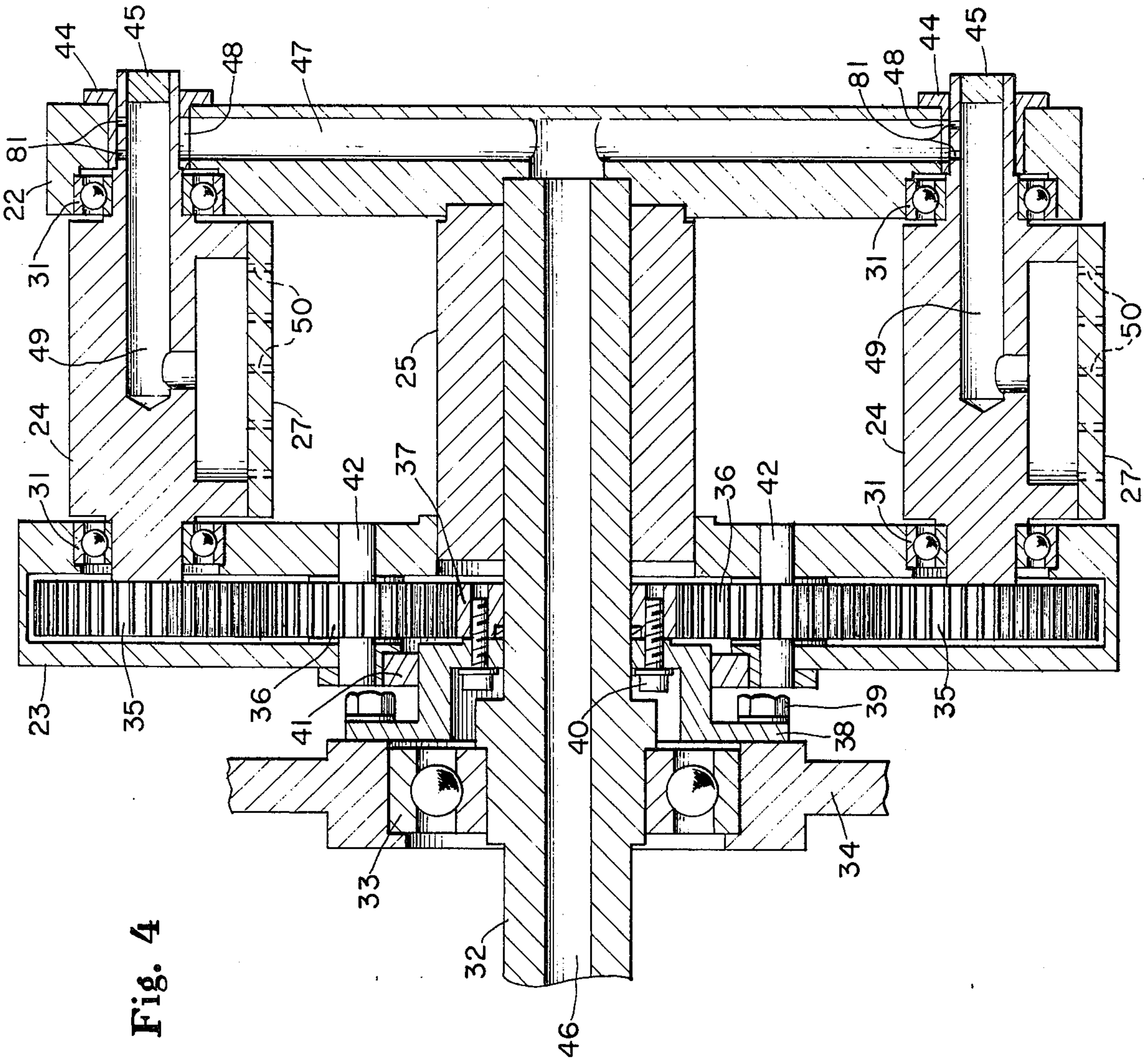
FIG. 4 is a rear cross sectional view of the tape tab transfer mechanism taken along line 4—4 of FIG. 1, and some of the mechanism's supporting members.

FIGS. 2, 3 and 4 provide more details of the tape tab transfer mechanism 21. Referring now to FIG. 4, the input shaft 32 is shown supported in the main frame 34 of the total machine (not shown). The input shaft 32 is supported in the main frame 34 by bearing 33. Tape tab transfer mechanism 21 is mounted on and rotates with the input shaft 32.

In the tape tab transfer mechanism 21, the left arm 22 and the right arm 23 are substantially coextensive and separated by the center spacer 25, and the arms 22 and 23 are secured to the center spacer 25. The center spacer 25 is "locked" to the input shaft 32 so that it, and subsequently the entire tape tab transfer mechanism 21, rotates with the input shaft 32. The center spacer 25 can be locked to the input shaft 32 by any of the well known means, one of which being a key 43 between the input shaft 32 and the center spacer 25 such as shown in FIG. 3. The tape tab handling members 24 are suspended rotatably between the arms 22 and 23 such as by bearings 31. The right arm 23 contains a planetary gear system which is an orienting means for the tab handling members 24 as said member moves through its orbital path.

The planetary gear 35 is locked to the tape tab handling member 24 so that they rotate in unison. The intermediate gear 36 is supported by the intermediate gear shaft 42 which is mounted in the right arm 23. The intermediate gear 36 is freely rotating and meshed with the planetary gear 35. The sun gear 37 is concentric with the input shaft 32 and the center of rotation of arm 23, and therefore it is also concentric with the orbital path of the tape tab handling member 24. The sun gear 37 also is meshed with the intermediate gear 36 and is stationary. The sun gear 37 is held stationary through a mounting to the main frame 34 as follows: the sun gear is mounted to the mounted to the sun gear bracket 38 by bolts 40 and the sun gear bracket 38 is in turn mounted to the main frame 34 by bolts 39. As an alternate embodiment, the sun gear 37 could also be rotatable, thereby allowing the other gears to be smaller which would allow the gear train to fit into a restricted space or avoid an obstacle. A seal 41 can be positioned between the arm 23 and the sun gear bracket 38 to close off the planetary gear system cavity within the right hand arm 23.

In operation the center spacer 25 and the arms 22 and 23 are rotationally driven by the input shaft 32 to provide orbit means for the tape tab handling members 24. The planetary gear system with the sun gear 37 being stationary also operates upon the tape tab handling member 24 to provide orienting means for the tape tab handling members 24 as said member is moved through its orbital path, whereby said member 24 is held in a constant attitude throughout its orbit such that the tape tab carrying surface 27 is always parallel to the plane of the web 63 in the applying station 77 (see FIG. 1).

Now referring to FIG. 3, the tape tab handling member 24 has a tape tab carrying surface 27, a knife 26 and a vacuum chamber 49 therewithin. Vacuum ports 50 lead from the vacuum chamber 49 within the tape tab handling member 24 to the tape tab carrying surface 27 and provide grip means for holding a tape tab 62, see FIG. 2, to the tape tab carrying surface 27. The knife 26 is positioned such that its knife edge 30 is adjacent to the tape tab carrying surface 27 and lies between a tape tab carrying surface 27 and the anvil 54 when the tape tab handling member 24 is at the cutoff station. The tape tab transfer mechanism 21 can have one or more tape tab handling members 24.

As shown in FIG. 4, a vacuum line is provided in the input shaft 32 and the tape tab transfer mechanism 21 provide suction in the vacuum ports 50 in the carrying surface 27 from a vacuum source (not shown) connected to the input shaft 32. The vacuum line is composed of the vacuum bore 46 in the input shaft 32, the vacuum bore 47 in the left arm 22, the vacuum bore 48 in the bushing 44 and the vacuum bore and chamber 49 in the tape tab handling member 24. An on-off switching mechanism for the vacuum can be incorporated into the interacting structure of the bushing 44 and the extension of the tape tab handling member 24 rotating therein. Vacuum switching mechanisms are well known to men of ordinary skill in the art and can be a selective placement of holes in a rotating member, such as holes 81 within the aforementioned extension of the tape tab handling member 24, which holes are periodically aligned with holes in the bushing 44. The plug 45 closes off an opening of the vacuum chamber 49 within the tape tab handling member 24 and is shown as merely one way of forming this part of the vacuum system. Many other structures for a vacuum system leading to the tape tab handling member 24 could also be used.

Lubricating rolls 28, as seen in FIGS. 1, 2 and 3, are attached to the arms 22 and 23 as part of the tape tab transfer mechanism 21. Each lubricating roll 28 is supported between the arms 22 and 23 by a roll support 29 which forms ans axis of rotation for the lubricating roll 28, and the roll support 29 is attached to the arms 22 and 23 by bolts 51. The lubricating rolls 28 are positioned on the arms so that the knife edge 30 makes tangential contact with the periphery of associated lubricating roll 28 at a point in the orbital path of the tape tab handling member 24 after the knife edge 30 has passed the anvil 54. The tangential contact is shown on the left hand side of FIG. 2 whereat the knife edge 30 is shown in contact with the periphery of the lubricating roll 28. The lubricating rolls 28 are freely rotating and not driven on the roll support 29 in this embodiment. The periphery of a lubricating roll 28 is elastic and resilient so that the knife edge 30 can deform the periphery slightly and the periphery will regain its undeformed configuration after the knife edge and the periphery separate. The periphery of the lubricating roll 28 can be made of a material such as felt or other materials capable of retaining lubricants.

The mechanism at the tape tab pick-up station can be one which places a precut tape tab in the path of the orbiting tape tab handling member 24 as it passes the pick-up station 76 or a cutoff mechanism such as shown in the drawings whereby bulk tape is fed across an anvil into the path of the orbiting tape tab handling member 24 and the free standing tape end 61 is cut off by the interaction between the knife edge 30 and the anvil 54. The anvil 54 is located adjacent to the path of the knife edge 30 such that the knife edge 30 contacts the near face of the anvil 54 as the knife edge 30 passes the anvil 54. The anvil 54 is attached to and supported by the anvil support 53 which is pivotally mounted from the main frame 34 (not shown). The anvil support 53 in this embodiment has an aperture therethrough such that the bulk tape 59 can be fed through the anvil support 53 and over the top surface of the anvil 54. The anvil 54 is moveable toward the tape tab transfer mechanism 21 by pivoting the anvil support 53 about the anvil support shaft 55 which is the mounting means for the anvil support 53 to the main frame 34. This pivoting can be accomplished by an anvil drive means, e.g., a cam operating on the anvil support 53 or the anvil support shaft 55, and the pivoting is between a first position, which is the cutting position of the anvil, and a second position which is toward the tape tab transfer mechanism 21. The movement of the anvil breaks any bond formed between the bulk tape and the anvil during cutoff. The distance between the first and second positions required to break such a bond depends upon the metering speed of the bulk tape across the anvil and the acceleration of the anvil. Generally this distance need not be great and ¼ inch or less is usually sufficient. The pivoting is timed to the rotation of the tape tab transfer mechanism 21 such that the anvil is moved from the first position to the second position after the knife edge 30 has passed the anvil and back to the first position before a knife edge 30 again approaches the anvil 54. The anvil movement mechanism described for breaking a bond between the anvil 54 and a pressure sensitive tape is considered a tape release means.

The cutting edge of the anvil 54 is located substantially on a radial of the orbital path followed by the tape tab handling member 24.

The bulk tape 59 can come ready formed, or if it is a multiple-ply tape, it can be formed on the machine from a plurality of laninae 60 by bringing the laminae together to form the bulk tape 59 before the bulk tape 59 reaches its drive and guide means (see FIG. 1). The laminae 60 are guided about idler rolls 58 to form the bulk tape 59 and the bulk tape 59 is directed between a driven V roll 56 and a mating idler V roll 57 to form the bulk tape 59 in a V shape and provide a free standing tape end 61 as disclosed in one embodiment in U.S. Pat. No. 2,990,081, issued to De Neui et al. on June 27, 1961. The driving roll and its associated rolls for moving the bulk tape 59 across the anvil 54 is the tape drive means. The tape guide means for the bulk tape 59 is the juxtaposition of the anvil 54 and the mating V rolls 56 and 57 so that the top surface of the anvil 54 and the mating V rolls 56 and 57 are aligned whereby the free standing tape end 61 is substantially on a radial of the orbital path traveled by the tape tab handling member 24. In this embodiment, the top surface of the anvil 54 and the top of the V roll 56 are at the same elevation to provide guide means. It is desirable to project the tape perpendicular to the cutting stroke of the knife edge 30 in order to cleanly sever the bulk tape in forming the tape tab.

The tape tab 62 shown in the right hand portion of FIG. 2 is applied to the continuously moving web 63 at the applying station 77 (see FIG. 1). The continuously moving web 63 is passed through the applying station 77 by a conveyor 64 driven by the main drive of the machine. The plane of the web 63 intersects the orbital path of the tape tab handling member 24 approximately tangentially. A web pressure roll 52 is located at the applying station 77 and is timed to the rotation of the tape tab transfer mechanism 21. The web pressure roll 52 has a lobe 78 thereon and is timed to the rotation of the tape tab handling member 24 such that it cooperates with the tape tab carrying surface 27 by raising the portion of the web 63 in the applying station 77 slightly when the tape tab carrying surface 27 is in the applying station 77, whereat the tape tab carrying surface and thus a tape tab 62 is parallel to the plane of the web, to positively bring the top surface of the web 63 into contact with the tape 62 on the tape tab carrying surface 27. The lobe 78 on the roll 52 provides a segmented back-up roll so that the web 63 is only momentarily pressed toward the tape tab 62 carried by the tape tab handling member 24 when said member is in the applying station. The segmented back-up roll accommodates reliable and accurate placement of the tape tab 62 on the web 63 in spite of any slight mismatch between the linear speeds of the tape tab 62 and the web 63.

In this embodiment wherein tape tabs 62 are applied to the backsheet of disposable diapers, the tape tab handling member 24 is partially offset over the edge of the continuously moving web 63, and the overhanging portion of a tape tab 62 as applied is subsequently folded around and under the edge of web 63. Of course, a mechanism such as described above may be used to place a tape tab of any length and width on any or all portions of a continuously moving web such as 63.

In operation, a web 63 is continuously moved through the applying station 77 by conveyor 64 which is driven by the main machine drive (not shown). The input shaft 32 of the tape tab transfer mechanism 21 is also driven by the main machine drive, and the rotation of the tape tab transfer mechanism 21 is timed to the speed of the web 63 such that the linear speed of the tape tab carrying surface 27 and the web 63 are approximately equal at the applying station 77. The web pressure roll 52 is also driven by the main machine drive and timed to the rotation of the tape tab transfer mechanism 21 such that the lobe 78 of the web pressure roll 52 is in the applying station 77 when a tape tab carrying surface 27 is in the applying station 77. The tape drive means continuously advances the bulk tape 59 over the anvil 54 and is timed to the rotation of the tape tab transfer mechanism 21 so as to provide a free standing tape end 61 of the proper length when a tape tab handling member 24 passes through the tape tab pick-up station 76, and the anvil drive means (not shown) associated with the anvil support 53 for moving that support between a first position and a second position is timed to the rotation of the tape tab transfer mechanism 21 such that the anvil is moved from position one to position two after a tape tab handling member 24 has passed the anvil and returns the anvil 54 from position two to position one before a tape tab handling member 24 again approaches the anvil 54.

Therefore, in operation, the web 63 moves continuously through the applying station 77. The bulk tape 59 is continuously metered over the anvil 54 to produce a free standing tape end 61. The vacuum source to the vacuum ports 50 is switched on as a tape tab handling member 24 approaches the anvil 54, whereby suction through the vacuum ports 50 is present when the tape tab handling member is in the pick-up station 76. A tape tab handling member 24 passes the anvil 54 whereby the knife edge 30 severs the free standing tape end 61 from the bulk tape 59 thereby forming a tape tab 62 and the tape tab 62 is held to the tape tab carrying surface 27 by the vacuum within the vacuum ports 50. The tape tab handling member 24 proceeds away from the anvil 54 and toward the applying station 77. After the tape tab handling member 24 leaves the anvil 54, the anvil 54 is jerked from position one to position two and immediately returned to position one by the anvil drive means. This movement of the anvil is to break any bond between the bulk tape 59 and the anvil 54 resulting from the cutoff operation so that the bulk tape 59 can be freely metered over the anvil 54. Tape tab handling member 24 continues along its orbital path to the applying station 77 whereat the lobe 78 on the web pressure roll 52 is also in the applying station 77 to force the web 63 against the tape tab 62 which is being carried by the tape tab carrying surface 27. At this position the vacuum within the vacuum ports 50 is switched off, releasing the tape tab 62 from the tape tab carrying surface 27 and transferring it to the web 63. The tape tab handling member 24 proceeds through and away from the applying station 77 and the knife edge 30 touches the periphery of the lubricating roll 28 as shown in FIG. 2, whereby a film of lubricant is deposited on the knife edge 30 to prevent a deposition of tape backing material or adhesive on the knife edge 30 which can otherwise occur during the cutting operation. The tape tab handling member 24 continues through its orbital path to again approach the anvil 54 and the sequence of events is then repeated.

A planetary gear system used in the tape tab transfer mechanism 21 will maintain the tape tab handling member 24 in a constant attitude throughout its orbital path so that the tape tab carrying surface 27 is continuously parallel to the plane of the web 63.

The web 63 continues along the conveyor 64 after a tape tab 62 has been placed on the web and subsequent operations to the web 63 can then be performed. The typically be folding the web into a z-pleat form, cutting the web into individual diapers, folding each diaper in half, accumulating a stack of diapers, and packing the accumulated stack of diapers into a carton.

Figure 5:
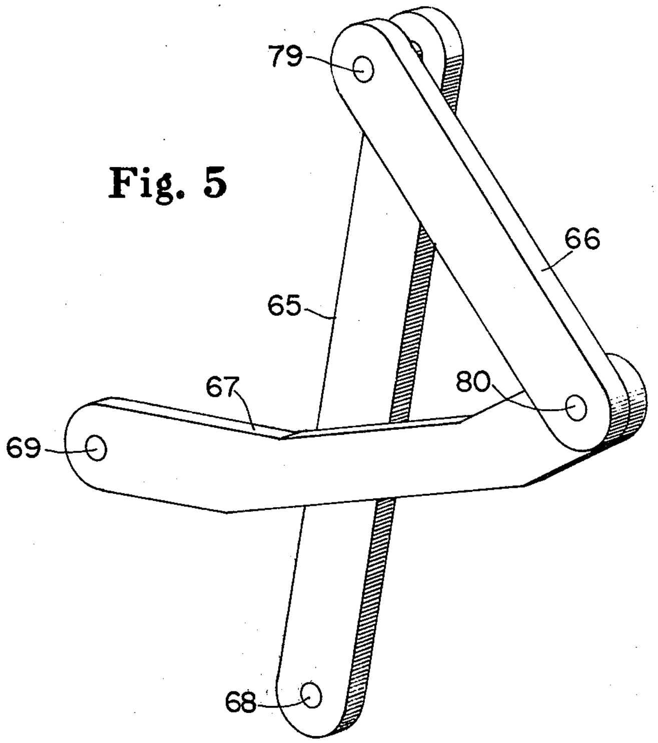
FIG. 5 is a perspective schematic of a bar linkage which can be used as an alternate orienting means for the tape head.
Figure 6:
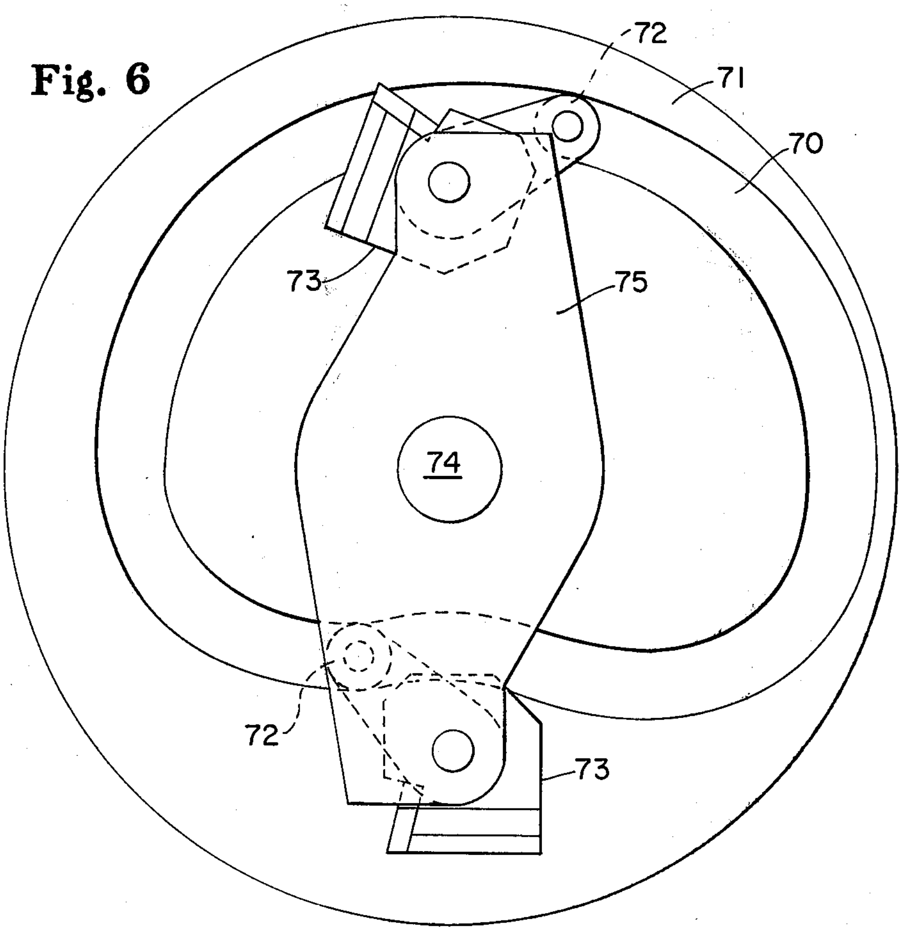
FIG. 6 is a side view of a cam track and follower mechanism which is also an alternate orienting means for the tape tab head.

Alternate orienting means to the planetary gear system, such as the bar linkage shown in FIG. 5 and the cam follower and track shown in FIG. 6, can be used for orienting the tape tab handling member 24 so that the tape tab carrying surface 27 is parallel to the free standing tape end 61 at the tape tab pick-up station 76 and is also parallel to the surface of the web 63 at the applying station 77. A bar linkage such as that of FIG. 5 having a first bar 65, a second bar 66, and a third bar 67, can produce the desired orientation for the tape tab carrying surface 27. The linkage would have two fixed centers of rotation 68 and 69 and two moving centers of rotation 79 and 80. Bar 65 is driven rotationally about the fixed center 68. Bar 66 is rotatably attached to bar 65 at moving center 79, the end of bar 65 opposite the fixed center 68. Bar 66 is integral with a tape tab handling member 24 and may be viewed as a simplified representation of that member. Bar 67 is rotatably attached to the end of bar 66 at moving center 80, i.e., opposite bar 66's attachment to bar 65. The end of bar 67 opposite from the attachment to bar 66 is rotatably mounted on fixed center 69.

In operation, bar 65 rotates about fixed center 68 moving moveable center 79 through a circular path. Moveable center 80 is moved through a circular path about fixed center 69 and maintained a constant distance, the length of bar 66, from moveable center 79. Remembering that bar 66 is a representation of a tape tab handling member 24, it can be seen that this bar linkage thus is an orienting means for a tape tab handling member and all parts thereof so that a bar linkage can be used to attain the desired orientation of the tape tab carrying surface 27 at specific points in the orbital path of the tape tab handling member 24.

A cam track and follower such as shown in FIG. 6 can also be used to attain the desired orientation of the tape tab carrying surface at selected points in its path. An input shaft 74 drives an arm 75. A tape tab handling member 73 is rotatably mounted on the arm 75 radially outward from the input shaft 74. A cam follower 72 is attached to the handling member 73 and follows a cam track 70 on a cam plate 71. The cam track 70 can be laid out to produce a desired orientation of the handling member 73 at various positions along the orbital path followed by the handling member 73.

Thus it is apparent that there has been provided, in accordance with the invention, a tape tab pick-up and applying apparatus that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations that fall within the spirit and broad scope of the appended claims.

What is claimed is:

1. An apparatus for applying tape tabs at spaced intervals on the surface of a continuously moving web as the web passes through a tape tab applying station, comprising:

a. an orbitable, rotatable, tape tab handling member having a generally flat tape tab carrying surface;

b. grip means associated with the carrying surface for holding the tape tab in contact with said carrying surface;

c. orbit means operatively associated with said member for moving said member through an orbital path which approximates the plane and the velocity of the web at the applying station; and d. orienting means operatively associated with said member for orienting said carrying surface parallel the surface of the web as said member approaches and moves through the applying station, whereby said tape tab and the surface of the web in the applying station are substantially parallel when they approximate and contact and wherein said orienting means comprises a planetary gear and a stationary sun gear, the planetary gear being attached to said member, and the planetary gear being operatively associated with the sun gear.

2. The apparatus of claim 1 wherein said carrying surface has spaced apertures therein and said grip means comprises a vacuum means within said member acting through said apertures, whereby said tape tabs are held in contact with the carrying surface.

3. The apparatus of claim 1 wherein the orbit means comprises a rotatable input shaft and an arm mounted thereon, said arm extending radially outwardly from said shaft, and said member being rotatably mounted on said arm radially outwardly from said shaft.

4. The apparatus of claim 3 including an intermediate gear between said planetary gear and said sun gear, and wherein said sun gear is concentric with the orbital path of the tape tab handling member and said planetary gear is rigidly fixed to said member.

5. The apparatus of claim 1 including a tape tab pick-up station whereat a tape tab is picked up by said carrying surface, wherein said orienting means also positions the carrying surface parallel to a radial of the handling member's orbital path at the pick-up station and said pick-up station comprising:

a. drive means for placing said tape tab in the orbital path of said carrying surface; and b. guide means cooperatively engaged with said tape tab for positioning the tape tab parallel to the orientation of said carrying surface is at the pick-up station.

6. The apparatus of claim 1 wherein said member includes a knife and including a. an anvil;

b. the anvil being outside and adjacent the orbital path of the member;

c. the knife being positioned between said carrying surface on the member and the anvil when the member is adjacent the anvil;

d. the cutting edge of the knife being adjacent the carrying surface and cooperating with the anvil to effect a cutting action between the knife and the anvil when the member is adjacent the anvil; and e. drive means cooperatively engaged with bulk tape for moving the free end of the bulk tape across the anvil into the orbital path; whereby the tape fed into the orbital path is cut to form a tape tab every time the member passes the anvil and the tape tab is carried away on the carrying surface to the applying station.

7. The apparatus of claim 5 wherein said orienting means also positions the carrying surface parallel to a radial of the handling member's orbital path when the carrying surface is adjacent the anvil and including tape guide means associated with the tape drive means for controlling the position of the free end of the bulk tape as fed, said guide means positioning said free end on a radial of the orbit of the member, whereby the tape is fed into the path of the member perpendicular to the path of the member passing the anvil.

8. The apparatus of claim 5 including a moveable support and anvil drive means associated with said support for moving said support, said anvil being fastened to said support, said support moveable so that said anvil moves between a first and second position, said first position being adjacent the orbital path, said second position being inside said orbital path, said drive means moving the anvil to the second position after the member passes the anvil, whereby said anvil is moved away from the bulk tape supply after each tape tab is cut to break any bond between a pressure sensitive bulk tape and the anvil which may be formed by the interaction between the knife and the anvil when the tape is cut.

9. The apparatus of claim 5 including a lubrication roll, the surface of said roll tangentially intersecting the path of the cutting edge of the knife, so that the cutting edge contacts the surface of the lubrication roll after cooperating with the anvil, whereby a lubricating film is deposited on the cutting edge to prevent a build-up of adhesive and tape materials on the cutting edge.

10. The appartus of claim 1 including an intermediate gear between said planetary gear and said sun gear, and wherein said sun gear is concentric with the orbital path of the tape tab handling member and said planetary gear is rigidly fixed to said member.

11. An apparatus for cutting tape tabs from a bulk strip of pressure sensitive tape and applying the tape tabs at spaced intervals on a continuously moving web as the web passes through a tape tab applying station, said apparatus comprising:

a. a rotatable arm;

b. drive means connected to said arm for rotating said arm;

c. a tape tab handling member being rotatably mounted on the arm radially outwardly from the center of rotation of the arm;

d. said tape handling member having a tape tab carrying surface and a knife edge parallel to and adjacent the carrying surface;
e. grip means for holding a tape tab in contact with the carrying surface;
f. a sun gear being concentric with the arm;
g. an intermediate gear being engaged with the sun gear;
h. a planetary gear attached to said member and engaged with the intermediate gear;
i. said gears being engaged so that the carrying surface is parallel to the web at the applying station;
j. the center of rotation of said arm being a distance from the tape applying station so that the path of the carrying surface during rotation of the arm tangentially contacts the web at the applying station;
k. an anvil being outside and adjacent the path of the knife edge, whereby the knife edge and anvil cooperate to sever tape tabs from the bulk strip of tape laying across the anvil when the knife edge passes the anvil during rotation of the arm;
l. tape release means for breaking any bond between a severed end of the bulk strip of tape and the anvil which may be formed when a tape tab is severed from the bulk strip;
m. a lubrication roll having a deformable, resilient peripheral surface containing a lubricant, said surface being tangential to the path of the knife edge so that the knife edge contacts the lubrication roll surface after it cooperates with the anvil to cut the tape; and
n. tape drive means for advancing the bulk strip across the anvil and into the path of the tape handling member.

* * * * *